United States Patent
Vijaya Kumar et al.

(10) Patent No.: US 12,122,381 B2
(45) Date of Patent: Oct. 22, 2024

(54) FULL SPEED RANGE ADAPTIVE CRUISE CONTROL SYSTEM FOR DETERMINING AN ADAPTIVE LAUNCH TIME FOR A VEHICLE

(71) Applicant: GM Global Technology Operations LLC, Detroit, MI (US)

(72) Inventors: Vivek Vijaya Kumar, Shelby Township, MI (US); Omer Tsimhoni, Bloomfield Hills, MI (US); Yi Guo Glaser, West Bloomfield, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 275 days.

(21) Appl. No.: 17/725,041

(22) Filed: Apr. 20, 2022

(65) Prior Publication Data
US 2023/0339464 A1 Oct. 26, 2023

(51) Int. Cl.
*B60W 30/18* (2012.01)
*B60W 30/14* (2006.01)

(52) U.S. Cl.
CPC ...... *B60W 30/18159* (2020.02); *B60W 30/14* (2013.01); *B60W 30/18027* (2013.01); *B60W 2420/403* (2013.01); *B60W 2552/53* (2020.02); *B60W 2554/4029* (2020.02); *B60W 2554/4049* (2020.02)

(58) Field of Classification Search
None
See application file for complete search history.

(56) References Cited

U.S. PATENT DOCUMENTS

| 2013/0297124 A1* | 11/2013 | Be | G06F 17/00 701/1 |
| 2014/0207358 A1* | 7/2014 | Seguchi | B60W 30/17 701/96 |
| 2016/0039420 A1* | 2/2016 | Tosaka | B60W 30/18027 701/99 |

(Continued)

FOREIGN PATENT DOCUMENTS

| CN | 112758091 A | * | 5/2021 | ............ B60W 30/14 |
| DE | 102015208432 A1 | * | 3/2016 | ............ B60W 10/04 |
| JP | 2019133435 A | * | 8/2019 | ............... G08G 1/16 |

OTHER PUBLICATIONS

Machine translation of DE102015208432 (A1) (Year: 2024).*
Machine translation for CN112758091A (Year: 2024).*

*Primary Examiner* — Amelia Vorce
(74) *Attorney, Agent, or Firm* — Vivacqua Crane, PLLC

(57) ABSTRACT

A full speed range adaptive cruise control system for a vehicle that stops at an intersection includes one or more controllers that execute instructions to receive localization data and situational data related to the vehicle. The one or more controllers determine, based on localization data and situational data, that the vehicle is approaching an intersection and will come to a stop at the intersection, where the vehicle is part of a queue including one or more surrounding vehicles. In response to determining the vehicle has come to a stop, the controller determines a position of the vehicle within the queue and an overall length of the queue. The controller calculates an adaptive launch time based on at least the position of the vehicle within the queue, the overall length of the queue, the situational data, and a timing delay associated with the queue.

20 Claims, 3 Drawing Sheets

(56) References Cited

U.S. PATENT DOCUMENTS

| | | | | |
|---|---|---|---|---|
| 2016/0101775 | A1* | 4/2016 | Gibson | B60W 20/20 |
| | | | | 903/902 |
| 2018/0319400 | A1* | 11/2018 | Kleinau | G08G 1/22 |
| 2018/0354368 | A1* | 12/2018 | Gotoh | B60L 58/12 |
| 2018/0354489 | A1* | 12/2018 | Stayton | B60W 10/20 |
| 2019/0111924 | A1* | 4/2019 | Rajendran | B60W 30/18 |
| 2019/0122548 | A1* | 4/2019 | Sakuma | G08G 1/08 |
| 2019/0143981 | A1* | 5/2019 | Naserian | F02N 11/0837 |
| | | | | 701/55 |
| 2019/0344789 | A1* | 11/2019 | Aoki | B60W 30/17 |
| 2019/0389465 | A1* | 12/2019 | Ogino | B60W 10/04 |
| 2020/0310427 | A1* | 10/2020 | Oyama | B60W 30/18159 |
| 2021/0171030 | A1* | 6/2021 | Lee | B60W 30/146 |
| 2022/0097723 | A1* | 3/2022 | Wang | B60W 40/08 |
| 2022/0176972 | A1* | 6/2022 | Miller | F02N 11/0837 |
| 2022/0314995 | A1* | 10/2022 | Lerner | B60W 30/18018 |

\* cited by examiner

FULL SPEED RANGE ADAPTIVE CRUISE CONTROL SYSTEM FOR DETERMINING AN ADAPTIVE LAUNCH TIME FOR A VEHICLE

INTRODUCTION

The present disclosure relates to a full speed range adaptive cruise control system that determines an adaptive launch time for a vehicle stopped at an intersection. The adaptive launch time is further customized based on user preferences, environmental factors, and dynamic input factors.

Many vehicles include various driver assistance systems that support a driver in a variety of ways. For example, adaptive cruise control (ACC) systems may relieve drivers from routine longitudinal vehicle control by ensuring the host vehicle is an acceptable headway distance from a preceding vehicle. Adaptive cruise control systems are either full speed range adaptive cruise control (FSRA) systems or limited speed range adaptive cruise control (LSRA) systems. Full speed range adaptive cruise control systems are able to bring a vehicle to a full stop.

Although driver assistance systems have the potential to enhance driver comfort and satisfaction, their success depends not only on their reliability, but also on driver acceptance. For example, full speed range adaptive cruise control systems may resume driving from a stop based on the movement of the vehicle that immediately precedes the ego vehicle and traffic signals and may take additional input from the driver or user. Thus, if the vehicle immediately preceding the ego vehicle is part of a queue of vehicles at a traffic light, then a timing delay associated with the progression of vehicles resuming driving from a stop may be introduced. The timing delay is created because the first vehicle in the queue may take about two to three seconds to resume driving once the traffic light changes from red to green, and each vehicle after the first vehicle may also take about one to two seconds before resuming driving. However, after a certain position in the queue, typically the fifth or sixth vehicle, the delay diminishes. If the ego vehicle is equipped with an autonomous driving system, then a late launch from stop may create annoyance or even cause the driver to override the autonomous control. Furthermore, if the ego vehicle resumes driving too early, this may create anxiety in the driver. Similarly, if the ego vehicle is manually driven and the notification instructing the driver to re-activate the system is generated either too early or too late, this may cause a driver to become confused.

Thus, while current full speed range adaptive cruise control systems achieve their intended purpose, there is a need in the art for an improved approach to determine when to launch the vehicle from a stop.

SUMMARY

According to several aspects, a full speed range adaptive cruise control system for a vehicle that stops at an intersection is disclosed. The full speed range adaptive cruise control system includes one or more controllers that execute instructions to receive localization data and situational data related to the vehicle. The one or more controllers determine, based on localization data and situational data, that the vehicle is approaching an intersection and will come to a stop at the intersection, where the vehicle is part of a queue including one or more surrounding vehicles. In response to determining the vehicle has come to a stop, the one or more controllers determine a position of the vehicle within the queue and an overall length of the queue. The one or more controllers calculate an adaptive launch time based on at least the position of the vehicle within the queue, the overall length of the queue, the situational data, and a timing delay associated with the queue, where the adaptive launch time indicates when the vehicle resumes driving after stopping at the intersection.

In another aspect, the timing delay represents an amount of time measured from a time when a traffic signal at the intersection switches from red to green and a point in time when the vehicle resumes driving.

In yet another aspect, the timing delay represents an amount of time measured from a time when a lead surrounding vehicle in the queue resumes driving and a point in time when the vehicle resumes driving.

In still another aspect, the one or more controllers execute instructions to estimate the position of the vehicle within the queue and the overall length of the queue based on historic vehicle data and near-real time data related to vehicle traffic within the intersection.

In an aspect, the historic vehicle data includes information related to vehicle position, travel position, and speed with respect to the vehicle traffic within the intersection, and the near-real time data includes live traffic information indicating a current trajectory of the vehicle traffic within the intersection.

In another aspect, the one or more controllers execute instructions to customize a value of the adaptive launch time based on user preferences, where customizing the adaptive launch time involves either increasing or decreasing a value of the adaptive launch time.

In yet another aspect, the one or more controllers execute instructions to determine the user preferences based on physical reactions observed by one or more vehicle systems that are part of the vehicle that performed by a user as the vehicle resumes driving from stop, wherein the physical reactions are indicative of a state of mind of the user.

In an aspect, the one or more controllers execute instructions to customize a value of the adaptive launch time based on one or more environmental factors, where customizing the adaptive launch time involves either increasing or decreasing a value of the adaptive launch time.

In another aspect, the one or more environmental factors are indicative of one or more of the following: roadway conditions, roadway geometry, lighting conditions, and pedestrian traffic within the intersection.

In yet another aspect, the one or more controllers execute instructions to customize a value of the adaptive launch time based on dynamic input factors, where customizing the adaptive launch time involves either increasing or decreasing a value of the adaptive launch time.

In an aspect, the dynamic input factors indicate an incident being performed by one or more of the surrounding vehicles within the queue, wherein the incident either increases or decreases the adaptive launch time.

In another aspect, the adaptive launch time represents an automatic launch time when the vehicle is propelled from the stop at the intersection.

In yet another aspect, the full speed range adaptive cruise control system includes an indicator in electronic communication with the one or more controllers, and wherein the one or more controllers execute instructions to instruct the indicator to generate a notification instructing a driver of the vehicle to re-activate the full speed range adaptive cruise control system.

In an aspect, the one or more controllers execute instructions to calculate an adaptive stop time, wherein the adaptive stop time indicates when the vehicle stops at the intersection.

In another aspect, the adaptive stop time is determined based on at least the position of the vehicle within the queue and the overall length of the queue.

In an aspect, the one or more controllers executes instructions to further determine the adaptive stop time based on the situational data and the timing delay associated with the queue.

In another aspect, a method for determining an adaptive launch time for a vehicle that stops at an intersection by a full speed range adaptive cruise control system is disclosed. The method includes receiving, by one or more controllers, localization data and situational data related to the vehicle. The method includes determining, based on localization data and situational data, that the vehicle is approaching an intersection and will come to a stop at the intersection, where the vehicle is part of a queue including one or more surrounding vehicles. In response to determining the vehicle has come to a stop, the method includes determining a position of the vehicle within the queue and an overall length of the queue. Finally, the method includes calculating, by the one or more controllers, an adaptive launch time based on at least the position of the vehicle within the queue, the overall length of the queue, the situational data, and a timing delay associated with the queue, wherein the adaptive launch time indicates when the vehicle resumes driving after stopping at the intersection.

In another aspect, the method includes customizing the adaptive launch time based on at least one of the following: user preferences, environmental factors, and dynamic input factors.

In yet another aspect, the method includes customizing the adaptive launch time by either increasing or decreasing a value of the adaptive launch time.

In another aspect, the method includes calculating an adaptive stop time, wherein the adaptive stop time indicates when the vehicle stops at the intersection.

Further areas of applicability will become apparent from the description provided herein. It should be understood that the description and specific examples are intended for purposes of illustration only and are not intended to limit the scope of the present disclosure.

BRIEF DESCRIPTION OF THE DRAWINGS

The drawings described herein are for illustration purposes only and are not intended to limit the scope of the present disclosure in any way.

DETAILED DESCRIPTION

The following description is merely exemplary in nature and is not intended to limit the present disclosure, application, or uses.

Figure 1:
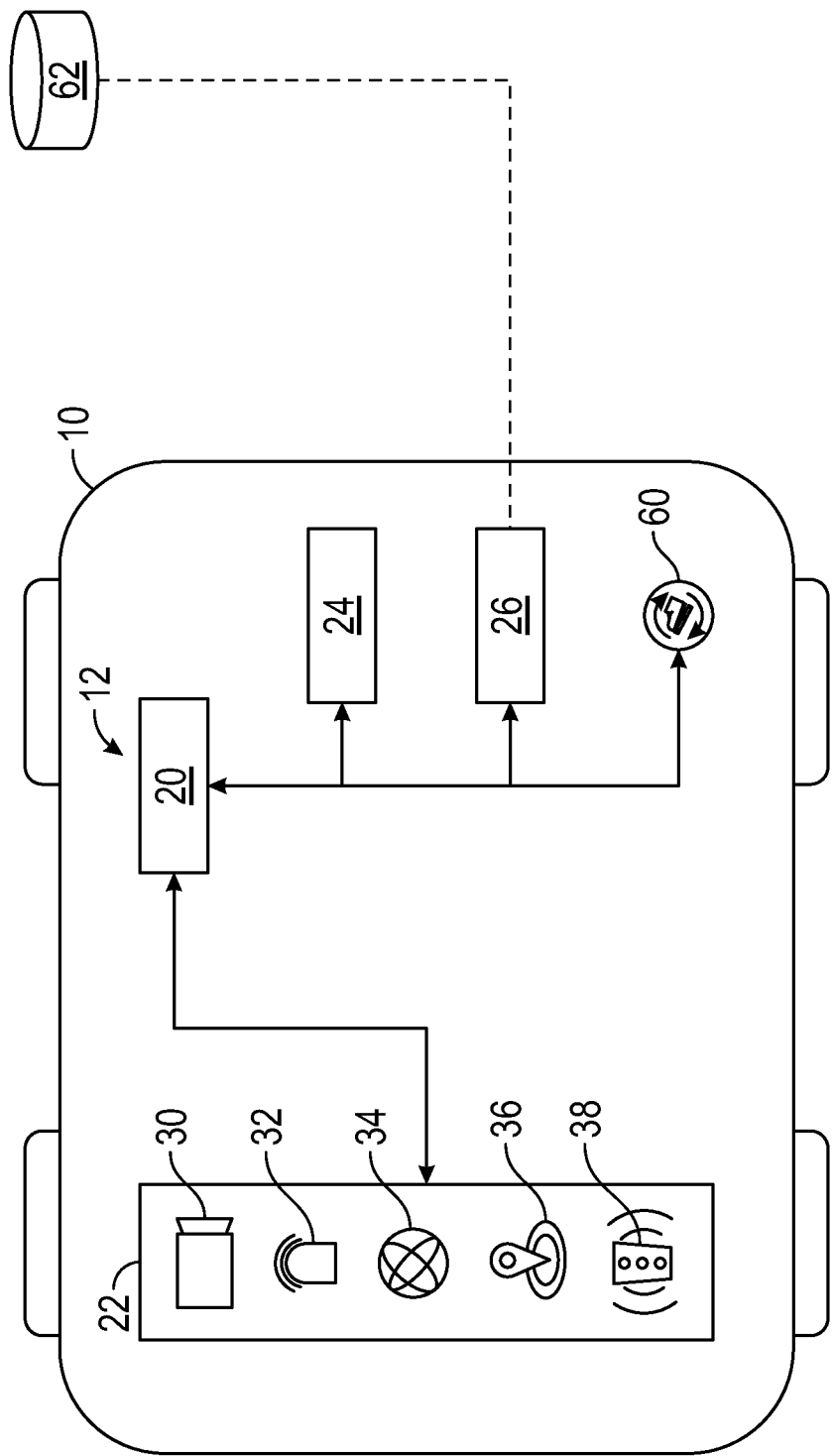
FIG. 1 is a schematic diagram of a vehicle including the disclosed full speed range adaptive cruise control system, according to an exemplary embodiment.

Referring to FIG. 1, an exemplary full speed range adaptive cruise control system 12 for a vehicle 10 is illustrated. The vehicle 10 may be any type of vehicle such as, but not limited to, a sedan, truck, sport utility vehicle, van, or motor home. The full speed range adaptive cruise control system 12 includes one or more controllers 20 in electronic communication with a plurality of vehicle sensors 22, one or more vehicle system 24, and one or more external vehicle networks 26 that are in wireless communication with the one or more controllers 20. In the example as shown in FIG. 1, the plurality of vehicle sensors 22 include one or more cameras 30, one or more radar sensors 32, an inertial measurement unit (IMU) 34, a global positioning system (GPS) 36, and LiDAR 38, however, it is to be appreciated that additional sensors may be used as well. The external vehicle networks 26 may include, but are not limited to, cellular networks, dedicated short-range communications (DSRC) networks, vehicle-to-infrastructure (V2X) networks, and cellular V2X (C-V2X). It is to be appreciated that while the present disclosure is directed towards a full speed range adaptive cruise control system 12, any other type of system that performs automatic longitudinal control that includes full speed range capabilities that are able to bring a vehicle to a full stop and automatically resumes driving may be used as well.

Figure 2:
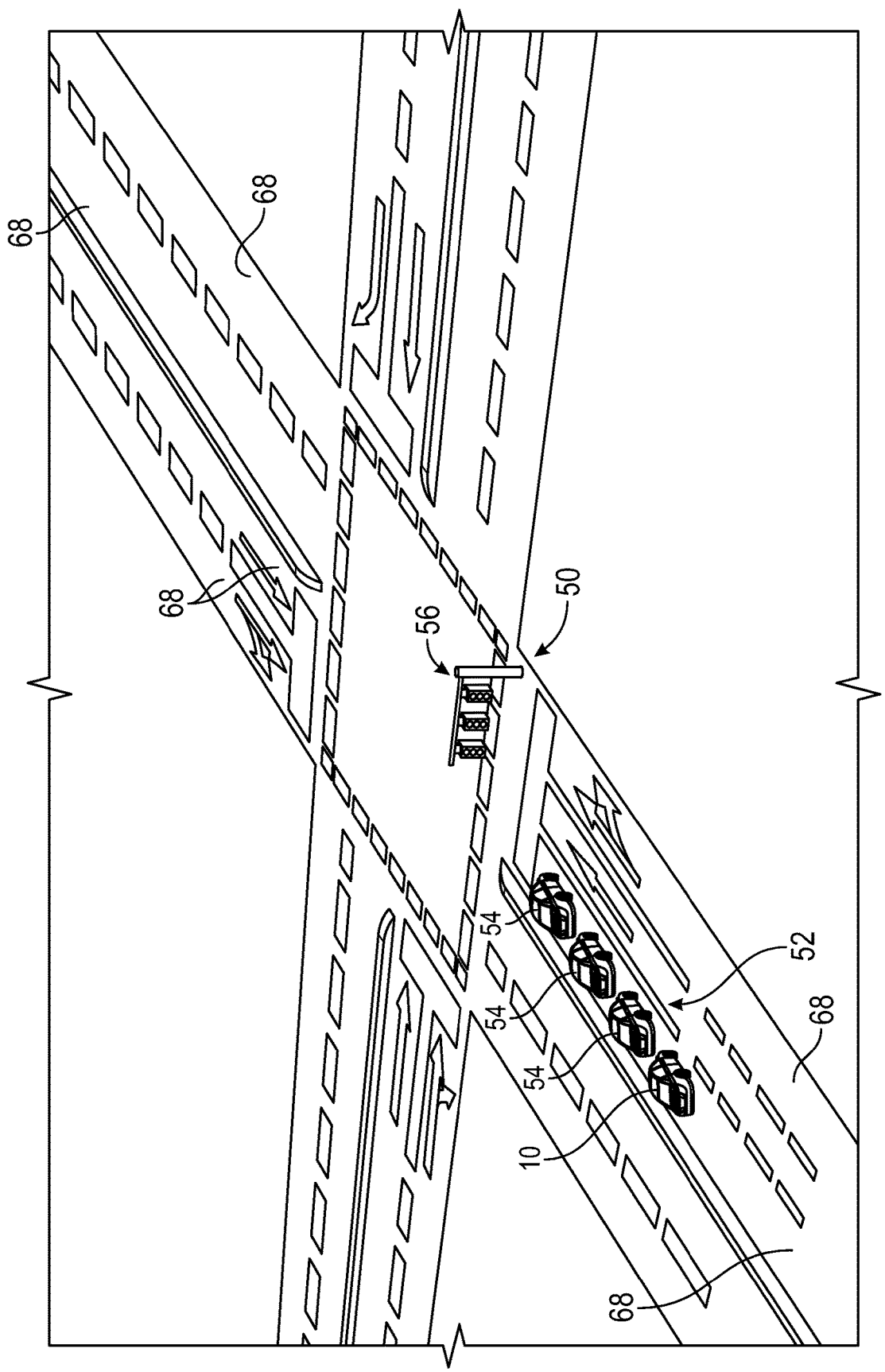
FIG. 2 is a schematic diagram of the vehicle shown in FIG. 1 stopped at an intersection, according to an exemplary embodiment.

FIG. 2 is a diagram of an exemplary four-way intersection 50, where the vehicle 10 is stopped at the intersection 50. FIG. 2 also illustrates a queue 52 of surrounding vehicles 54 located at the intersection 50. As seen in FIG. 2, the vehicle 10 is part of the queue 52 including one or more surrounding vehicles 54. Referring to FIGS. 1 and 2, as explained below, the full speed range adaptive cruise control system 12 determines an adaptive launch time for the vehicle 10. The adaptive launch time indicates when the vehicle 10 resumes driving after stopping at the intersection 50. Specifically, the full speed range adaptive cruise control system 12 includes an auto resume mode where the controller 20 instructs the vehicle 10 to accelerate from stop to a set speed. The adaptive launch time is determined based on at least a position of the vehicle 10 within the queue 52, an overall length of the queue 52, situational data, and a timing delay associated with the queue 52. The overall length of the queue 52 is expressed in number of vehicles. For example, in the embodiment as shown in FIG. 2, the position of the vehicle 10 is last, and the overall length of the queue 52 is four vehicles. In embodiments, the adaptive launch time is further based on historic vehicle data and near-real time data related to traffic within the intersection 50. In embodiments, the full speed range adaptive cruise control system 12 customizes a value of the adaptive launch time based on one or more user factors, one or more environmental factors, and one or more dynamic input factors. As also explained below, in an embodiment the full speed range adaptive cruise control system 12 also determines an adaptive stop time as well based on at least a position of the vehicle 10 within the queue 52 and an overall length of the queue 52.

In the embodiment as shown in FIG. 2, the queue 52 of surrounding vehicles 54 are shown stopped at a traffic signal 56, however, it is to be appreciated that the surrounding vehicles 54 may also stop at a traffic sign as well. Although FIG. 2 illustrates a four-way intersection 50, it is to be appreciated that the intersection 50 may be any other type of traffic stop where vehicles come to a complete stop at a traffic light or a traffic sign such as, for example, a three-way stop or a two-way stop.

In an embodiment, the vehicle 10 includes autonomous driving features that allow the vehicle 10 to launch automatically from a stop at the intersection 50. Therefore, the adaptive launch time represents an automatic launch time when the vehicle 10 is propelled from a stop at the intersection 50 by the full speed range adaptive cruise control system 12. In another embodiment, the vehicle 10 may be manually launched from stop at the intersection 50 by a driver. Specifically, in an embodiment, the full speed range adaptive cruise control system 12 includes an indicator 60 in electronic communication with the controller 20. In this embodiment, the controller 20 instructs the indicator 60 to generate a notification instructing the driver of the vehicle 10 to re-activate the full speed range adaptive cruise control system 12. In an embodiment, the notification may be a light instructing the driver to tap a gas pedal to re-active the full speed range adaptive cruise control system 12, however, it is to be appreciated that the indicator 60 may include other devices that generate the notification as well. For example, in another embodiment, the indicator 60 may be a speaker that generates an audio notification or a motor that generates haptic vibrations on the accelerator pedal or seat.

The one or more vehicle system 24 may include systems such as, but not limited to, an automated driving system, a driver monitoring system (DMS), a braking system, and an engine start-stop system. The engine start-stop system automatically shuts down and restarts an internal combustion engine of the vehicle 10 to conserve fuel. An engine start time and an engine stop time of the engine start-stop system is a function of the adaptive launch time and the adaptive stop time. Specifically, for example, if the adaptive launch time is relatively short in duration, then in some instances the engine start-stop system may not stop the engine. It is to be appreciated that adjusting the engine start time and stop times for the engine start-stop system based on the adaptive launch time and the adaptive start time may enhance fuel economy.

As mentioned above, the external vehicle networks 26 may include cellular networks, DSRC networks, and V2X networks that collect data such as, but not limited to, signal phase and timing (SPaT) data that includes a current state of a traffic signal, intersection map data (MAP) that indicates road geometry of an intersection, historic vehicle data, near-real time data, and pedestrian information. The historic vehicle data relates to traffic within the intersection 50 may be stored on one or more databases 62 that are remotely located from the vehicle 10. It is to be appreciated that the historic vehicle data includes information collected from numerous vehicles that have driven within a specific intersection. The historic vehicle data includes historic trajectory data including information related to factors such as, but not limited to, vehicle position, travel position, and speed for vehicle traffic within the intersection 50. In an embodiment, the historic vehicle data may further indicate historic trajectory data based on timing, such as trajectory data based on a time of day or day of the week. The near-real time data includes live traffic information indicating the current trajectory of the vehicle traffic within the intersection 50 and may be received by the controller 20 from the external vehicle networks 26, such as from cellular networks or V2X.

Continuing to refer to FIGS. 1 and 2, the controller 20 receives localization data and situational data related to the vehicle 10 from the plurality of vehicle sensors 22, the one or more vehicle system 24, and the external vehicle networks 26. The localization data indicates vehicle position and the situational data includes information that provides the controller 20 with situational awareness of the surrounding environment and includes information such as, but not limited to, SPaT data, MAP data, data related to driver attentiveness from the DMS, and object detection data. The controller 20 monitors the localization data and the situational data and determines the vehicle 10 is approaching and will come to a stop at the intersection 50. As seen in FIG. 2, the vehicle 10 is part of the queue 52 located at the intersection 50. In response to determining the vehicle 10 has come to a stop, the controller 20 determines the position of the vehicle 10 within the queue 52 and the overall length of the queue 52.

In one non-limiting embodiment, the overall length of the queue 52 is included as part of the network messages, such as V2X message, received by the controller 20. Thus, the controller 20 determines the overall length of the queue 52 based on the V2X messages. Alternatively, in another approach, the controller 20 estimates the overall length of the queue 52 based on the road geometry at the intersection 50, where the road geometry of the intersection 50 includes information such as, but not limited to, a stop bar distance, a number of lanes 68 at the intersection, and the direction of allowed travel for each of the lanes 68. It is to be appreciated that if the controller 20 determines the overall length of the queue 52 based on the road geometry, then the overall length of the queue 52 does not include any of the surrounding vehicles 54 located behind the vehicle 10. In an embodiment, the controller 20 estimates the position of the vehicle 10 within the queue 52 based on the overall length of the queue 52 using one or more look-up tables. The look-up tables may provide an estimate for the number of surrounding vehicles 54 situated in front of the vehicle 10 based on a distance to the stop bar. In an embodiment, the look-up tables may be updated based on the historic vehicle data.

In one embodiment, the controller 20 further estimates the position of the vehicle 10 within the queue 52 and the overall length of the queue 52 based on the historic vehicle data and the near-real time data related to traffic within the intersection 50. This is because the distribution of the surrounding vehicles 54 may vary based on the historic factors such as, but not limited to, location of the intersection 50, time of day, and day of the week. For example, some intersections 50 nearby a school or office building may be more congested on a weekday versus a weekend.

Continuing to refer to FIGS. 1 and 2, the controller 20 then calculates the adaptive launch time based on the position of the vehicle 10 within the queue 52, the overall length of the queue 52, the situational data, and a timing delay associated with the queue 52, where the adaptive launch time indicates when the vehicle 10 resumes driving after stopping at the intersection 50. The timing delay associated with the queue 52 is created as the surrounding vehicles 54 situated in upstream of the vehicle 10 in the queue resume driving from stop. The timing delay represents an amount of time measured from a time when the traffic signal 56 switches from red to green and a point in time when the vehicle 10 resumes driving from stop once an immediately preceding vehicle in the queue 52 moves forward. Alternatively, if a traffic sign is used in place of the traffic signal 56, the timing delay represents an amount of time measured from a time when a lead surrounding vehicle 54 in the queue 52 resumes driving and a point in time when the vehicle 10 resumes driving from stop once an immediately preceding vehicle in the queue 52 moves forward.

In the example as shown in FIG. 2, the first surrounding vehicle 54 in the queue 52 may take two to three seconds to resume driving once the traffic signal 56 changes from red to green. The two surrounding vehicles 54 after the first surrounding vehicle 54 may also take an additional one to two seconds before resuming driving. Thus, in the present example, the timing delay is between about four to about seven seconds long.

In one embodiment, the controller 20 determines the timing delay based on one or more look-up tables, where the timing delay is selected based on the position of the vehicle 10 within the queue 52. In an embodiment, the controller 20 adds a relatively small increment of time to the time delay. For example, an increment of about 0.05 seconds may be added to the time delay. In one embodiment, the controller 20 further determines the timing delay based on vehicle classification as well. In an embodiment, the vehicle classification refers to a weight class, where the weight class may indicate a light-duty, medium-duty, or heavy-duty vehicle. For example, a heavy-duty vehicle such as a city transit bus affects the timing delay for the vehicle 10 within the queue 52 in a different manner than a passenger sedan, since heavy-duty vehicles take a longer time to resume driving from stop, and also take more space within the lane 68.

In an embodiment, the controller 20 calculates an adaptive stop time for the vehicle 10 as well. The adaptive stop time indicates when the vehicle 10 comes to the stop at the intersection 50. The adaptive stop time is determined based on at least the position of the vehicle 10 within the queue 52 and the overall length of the queue 52. In an embodiment, the controller 20 further determines the adaptive stop time based on the position of the vehicle 10 within the queue 52, the overall length of the queue 52, the situational data, and the timing delay associated with the queue 52.

The controller 20 further customizes the adaptive launch time based on one or more of the following: user preferences, environmental factors, and dynamic input factors. It is to be appreciated that customizing the adaptive launch time involves either increasing or decreasing a value for the adaptive launch time. The controller 20 determines the user preferences based on physical reactions that are observed by the vehicle systems 24 performed by a user as the vehicle 10 resumes driving from the stop at the intersection 50. The physical reactions are indicative of a state of mind of the user. Some examples of physical reactions that indicate a state of mind of the user include, but are not limited to, a driver attempting to manually resume driving from the stop, the driver manually disengaging the vehicle 10 while resuming driving from the stop, and physical reactions by the occupants of the vehicle 10. The driver may manually disengage the vehicle 10 by performing actions such as, for example, depressing a brake pedal an effort to override the full speed range adaptive cruise control system 12. In this example, the driver state of mind is that the vehicle 10 is resuming driving too soon. Physical reactions by one or more occupants of the vehicle 10 may be detected by in-cabin cameras, such as a camera included as part of a DMS. Some examples of physical reactions include facial expressions and various body movements. For example, if the controller 20 determines that the driver always depresses the brake pedal when the vehicle 10 resumes driving, then the controller 20 customize the adaptive launch time based on the user preference to resume driving at a later time. Accordingly, the controller 20 may increase the adaptive launch time.

The controller 20 determines the environmental factors based on wireless data received from the external vehicle networks 26 and input from the various vehicle sensors 22. The environmental factors are indicative of one or more of the following: roadway conditions, roadway geometry, lighting conditions, and pedestrian traffic regarding the intersection 50. Some examples of roadway conditions include, for example, ice or precipitation on roadway surfaces, which may increase the adaptive launch time. Some examples of roadway geometry include determining if a lane 68 is a turn lane, which increases the adaptive launch time. The lighting conditions indicate daylight conditions, twilight or reduced lighting conditions, and nighttime conditions. For example, the controller may customize the adaptive launch time by increasing the launch time during nighttime conditions, since there is limited visibility at night.

The controller 20 determines the dynamic input factors based on data received from the one or more vehicle systems 24 and the external vehicle networks 26, where the dynamic input indicates an incident that is performed by one or more of the surrounding vehicles 54 within the queue 52, where the incident either increases or decreases the adaptive launch time. For example, the controller 20 may receive data from the external vehicle networks 26 indicating one of the surrounding vehicles 54 upstream of the vehicle 10 in the queue 52 is performing hard or sudden braking. In this example, the incident is hard braking by one of the surrounding vehicles 54 located upstream in the queue 52, and the controller 20 customizes the adaptive launch time by increasing the adaptive launch time. In another example, the controller 20 receives data from the external vehicle networks 26 indicating one or more surrounding vehicles 54 in the queue 52 downstream of the vehicle 10 are applying their horns, signaling the vehicle 10 to resume driving. In this example, the incident is the surrounding vehicles 54 applying their horn, and the controller 20 customizes the adaptive launch time by decreasing the adaptive launch time.

In one embodiment, the controller 20 customizes the adaptive launch time based on the user preferences, the environmental factors, and the dynamic input factors, where the customization is determined using Equation 1:

$$\text{Adaptive launch time} = a_l * f_1(\text{user preferences}) + b_l * f_2(\text{environmental factors}) + c_l * f_3(\text{dynamic input factors}) \quad \text{Equation 1}$$

where $a_l$, $b_l$, and $c_l$ are weighting coefficients that are determined empirically based on a calibration process, and $f_1$, $f_2$, and $f_3$ represent functions.

In another embodiment, the controller 20 customizes the adaptive stop time based on one or more of the following: the user preferences, the environmental factors, and the dynamic input factors. In the event the controller 20 customizes the adaptive stop time, the environmental factors may include roadway conditions that make it challenging for a vehicle to come to a stop, such as ice or snow. Furthermore, in the event the controller 20 customizes the adaptive stop time, the dynamic input factor may include cycle timing of the traffic light 56. For example, if the controller 20 receives SPaT data indicating the traffic light 56 is about to turn red, then the adaptive stop time is increased, and if the SPaT data indicates the traffic light 56 is about to turn green then the adaptive stop time is decreased.

In one embodiment, the controller 20 customizes the adaptive stop time based on the user preferences, the environmental factors, and the dynamic input factors, where the customization is determined using Equation 2:

$$\text{Adaptive launch time} = a_s * f_1(\text{user preferences}) + b_s * f_2(\text{environmental factors}) + c_s * f_3(\text{dynamic input factors}) \quad \text{Equation 2}$$

where $a_s$, $b_s$, and $c_s$ are weighting coefficients that are determined empirically based on a calibration process, and $f_1$, $f_2$, and $f_3$ represent functions.

Figure 3:
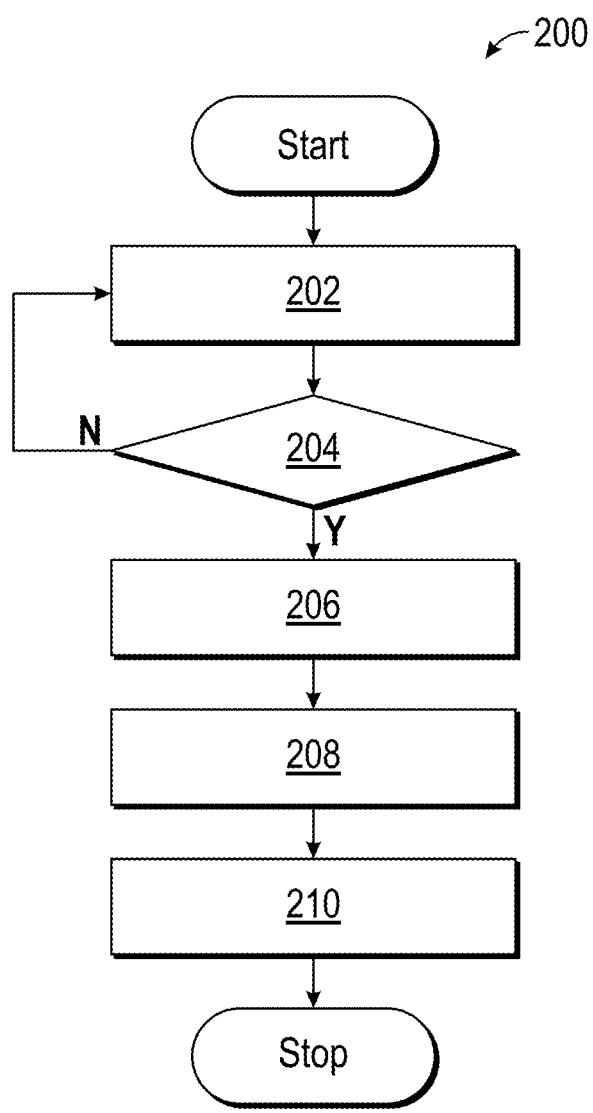
FIG. 3 is a process flow diagram illustrating a method for calculating an adaptive launch time for the vehicle, according to an exemplary embodiment.

FIG. 3 is a process flow diagram illustrating a method 200 for determining the adaptive launch time. Referring generally to FIGS. 1-3, the method 200 may begin at block 202. In block 202, the controller 20 receives localization data and situational data related to the vehicle 10 from the plurality of vehicle sensors 22, the one or more vehicle system 24, and the external vehicle networks 26. The method 200 may then proceed to decision block 204.

In decision block 204, the controller 20 monitors the localization data and the situational data and continues to do so until determining the vehicle 10 is approaching and will come to a stop at the intersection 50. The method 200 may then proceed to block 206.

In block 206, the controller 20 determines the position of the vehicle 10 within the queue 52 and the overall length of the queue 52. The method 200 may then proceed to block 208.

In block 208, the controller 20 calculates the adaptive launch time based on at least the position of the vehicle within the queue 52, the overall length of the queue 52, the situational data, and a timing delay associated with the queue 52, where the adaptive launch time indicates when the vehicle 10 resumes driving after stopping at the intersection 50. The method 200 may then proceed to block 210.

In block 210, the controller 20 customizes the adaptive launch time based on at least one of the following: the user preferences, the environmental factors, and the dynamic input factors, which are described above. As mentioned above, in embodiments the adaptive launch time may be used to determine the engine start and stop times for the engine start-stop system. The method 200 may then terminate.

Referring generally to the figures, the disclosed system provides various technical effects and benefits by providing an approach for determining the adaptive launch time for a vehicle. The disclosed adaptive launch time is determined based on at least a position of the vehicle within the queue, an overall length of the queue, situational data, and a timing delay associated with the queue. In contrast, some systems presently available may only resume driving from a stop in response to detecting a green traffic signal and that the preceding vehicle has moved ahead, and do not account for the timing delays that are observed when a queue of vehicles resume driving. In embodiment, the adaptive launch time may be further customized based on user preferences, environmental factors, and dynamic input factors. Finally, the adaptive launch time and adaptive stop times may be used to determine the engine start and stop times for the engine start-stop system, thereby enhancing fuel economy.

The controllers may refer to, or be part of an electronic circuit, a combinational logic circuit, a field programmable gate array (FPGA), a processor (shared, dedicated, or group) that executes code, or a combination of some or all of the above, such as in a system-on-chip. Additionally, the controllers may be microprocessor-based such as a computer having a at least one processor, memory (RAM and/or ROM), and associated input and output buses. The processor may operate under the control of an operating system that resides in memory. The operating system may manage computer resources so that computer program code embodied as one or more computer software applications, such as an application residing in memory, may have instructions executed by the processor. In an alternative embodiment, the processor may execute the application directly, in which case the operating system may be omitted.

The description of the present disclosure is merely exemplary in nature and variations that do not depart from the gist of the present disclosure are intended to be within the scope of the present disclosure. Such variations are not to be regarded as a departure from the spirit and scope of the present disclosure.

What is claimed is:

1. A full speed range adaptive cruise control system for a vehicle that stops at an intersection, the full speed range adaptive cruise control system comprising:
   one or more controllers in electronic communication with an engine start-stop system, wherein the one or more controllers execute instructions to:
      receive localization data and situational data related to the vehicle;
      determine, based on the localization data and the situational data, that the vehicle is approaching an intersection and will come to a stop at the intersection, wherein the vehicle is part of a queue including one or more surrounding vehicles;
      in response to determining the vehicle is approaching and will come to a stop at the intersection, determine a position of the vehicle within the queue and an overall length of the queue;
      calculate an adaptive launch time based on at least the position of the vehicle within the queue, the overall length of the queue, the situational data, and a timing delay associated with the queue, wherein the adaptive launch time indicates when the full speed range adaptive cruise control system instructs the vehicle to resume driving after stopping at the intersection, and wherein an engine start time and an engine stop time of the engine start-stop system are both a function of the adaptive launch time and an adaptive stop time; and
      instruct the full speed range adaptive cruise control system to automatically launch the vehicle from the stop at the intersection based on the adaptive launch time.

2. The full speed range adaptive cruise control system of claim 1, wherein the timing delay represents an amount of time measured from a time when a traffic signal at the intersection switches from red to green and a point in time when the vehicle resumes driving.

3. The full speed range adaptive cruise control system of claim 1, wherein the timing delay represents an amount of time measured from a time when a lead surrounding vehicle in the queue resumes driving and a point in time when the vehicle resumes driving.

4. The full speed range adaptive cruise control system of claim 1, wherein the one or more controllers execute instructions to:
   estimate the position of the vehicle within the queue and the overall length of the queue based on historic vehicle data and near-real time data related to vehicle traffic within the intersection.

5. The full speed range adaptive cruise control system of claim 4, wherein the historic vehicle data includes information related to vehicle position, travel position, and speed with respect to the vehicle traffic within the intersection, and the near-real time data includes live traffic information indicating a current trajectory of the vehicle traffic within the intersection.

6. The full speed range adaptive cruise control system of claim 1, wherein the one or more controllers execute instructions to:
   customize a value of the adaptive launch time based on user preferences, wherein customizing the adaptive launch time involves either increasing or decreasing a value of the adaptive launch time.

7. The full speed range adaptive cruise control system of claim 6, wherein the one or more controllers execute instructions to:

determine the user preferences based on physical reactions observed by one or more vehicle systems that are part of the vehicle that performed by a user as the vehicle resumes driving from stop, wherein the physical reactions are indicative of a state of mind of the user.

8. The full speed range adaptive cruise control system of claim 1, wherein the one or more controllers execute instructions to:
customize a value of the adaptive launch time based on one or more environmental factors, wherein customizing the adaptive launch time involves either increasing or decreasing a value of the adaptive launch time.

9. The full speed range adaptive cruise control system of claim 8, wherein the one or more environmental factors are indicative of one or more of the following: roadway conditions, roadway geometry, lighting conditions, and pedestrian traffic within the intersection.

10. The full speed range adaptive cruise control system of claim 1, wherein the one or more controllers execute instructions to:
customize a value of the adaptive launch time based on dynamic input factors, wherein customizing the adaptive launch time involves either increasing or decreasing a value of the adaptive launch time.

11. The full speed range adaptive cruise control system of claim 10, wherein the dynamic input factors indicate an incident being performed by one or more of the surrounding vehicles within the queue, wherein the incident either increases or decreases the adaptive launch time.

12. The full speed range adaptive cruise control system of claim 1, wherein the one or more controllers execute instructions to:
calculate the adaptive stop time, wherein the adaptive stop time indicates when the vehicle stops at the intersection.

13. The full speed range adaptive cruise control system of claim 12, wherein the adaptive stop time is determined based on at least the position of the vehicle within the queue and the overall length of the queue.

14. The full speed range adaptive cruise control system of claim 12, wherein the one or more controllers executes instructions to further determine the adaptive stop time based on the situational data and the timing delay associated with the queue.

15. A method for determining an adaptive launch time for a vehicle that stops at an intersection by a full speed range adaptive cruise control system, the method comprising:
receiving, by one or more controllers, localization data and situational data related to the vehicle;
determining, based on the localization data and the situational data, that the vehicle is approaching an intersection and will come to a stop at the intersection, wherein the vehicle is part of a queue including one or more surrounding vehicles;
in response to determining the vehicle is approaching and will come to a stop at the intersection, determining a position of the vehicle within the queue and an overall length of the queue;
calculating, by the one or more controllers, an adaptive launch time based on at least the position of the vehicle within the queue, the overall length of the queue, the situational data, and a timing delay associated with the queue, wherein the adaptive launch time indicates when the full speed range adaptive cruise control system instructs the vehicle to resume driving after stopping at the intersection, and wherein an engine start time and an engine stop time of an engine start-stop system are both a function of the adaptive launch time and an adaptive stop time; and
instructing, by the one or more controllers, the full speed range adaptive cruise control system to automatically launch the vehicle from the stop at the intersection based on the adaptive launch time.

16. The method of claim 15, wherein the method includes:
customizing the adaptive launch time based on at least one of the following: user preferences, environmental factors, and dynamic input factors.

17. The method of claim 16, comprising:
customizing the adaptive launch time by either increasing or decreasing a value of the adaptive launch time.

18. The method of claim 15, comprising:
calculating the adaptive stop time, wherein the adaptive stop time indicates when the vehicle stops at the intersection.

19. The full speed range adaptive cruise control system of claim 1, wherein the position of the vehicle within the queue is determined based on one or more look-up tables.

20. The full speed range adaptive cruise control system of claim 1, wherein the situational data includes one or more of the following: signal phase and timing (SPaT) data, intersection map data (MAP) data, data related to driver attentiveness from a driver monitoring system (DMS), and object detection data.

* * * * *